(12) United States Patent
Jeong

(10) Patent No.: US 10,010,810 B1
(45) Date of Patent: Jul. 3, 2018

(54) CONDENSING HEAT EXCHANGER SYSTEM

(71) Applicant: Arkansas State University, State University, AR (US)

(72) Inventor: Kwangkook Jeong, Jonesboro, AR (US)

(73) Assignee: Arkansas State University—Jonesboro, State University, AR (US)

( * ) Notice: Subject to any disclaimer, the term of this patent is extended or adjusted under 35 U.S.C. 154(b) by 1023 days.

(21) Appl. No.: 14/076,013

(22) Filed: Nov. 8, 2013

Related U.S. Application Data

(60) Provisional application No. 61/724,898, filed on Nov. 9, 2012.

(51) Int. Cl.
*F28D 7/08* (2006.01)
*B01D 5/00* (2006.01)
*F01N 3/28* (2006.01)
*F28D 7/16* (2006.01)

(52) U.S. Cl.
CPC ......... *B01D 5/0075* (2013.01); *F01N 3/2889* (2013.01); *F28D 7/1615* (2013.01); *F28D 7/1623* (2013.01)

(58) Field of Classification Search
CPC ..... F28D 7/16215; F28D 7/1623; F24H 8/006
USPC ......................... 165/150, 157, 110
See application file for complete search history.

(56) References Cited

U.S. PATENT DOCUMENTS

| | | | | | |
|---|---|---|---|---|---|
| 1,717,334 | A | * | 6/1929 | De Florez | C10G 9/20 122/236 |
| 3,294,162 | A | * | 12/1966 | Loehlein et al. | B21D 53/04 165/172 |
| 3,368,615 | A | * | 2/1968 | Brown et al. | F25B 39/02 165/149 |
| 3,483,920 | A | * | 12/1969 | Heyn et al. | F28D 7/0058 165/157 |
| 3,882,019 | A | * | 5/1975 | Burke | C02F 9/00 210/711 |
| 4,227,647 | A | * | 10/1980 | Eriksson | F24H 4/02 122/20 B |
| 4,309,947 | A | * | 1/1982 | Ketterer | F24H 8/006 110/203 |
| 4,444,156 | A | * | 4/1984 | Iwasaki et al. | F24H 1/145 110/203 |
| 4,475,587 | A | * | 10/1984 | Vasiliev et al. | F28D 7/0058 165/140 |
| 4,543,892 | A | * | 10/1985 | Tomlinson et al. | B01D 53/507 110/203 |

(Continued)

*Primary Examiner* — Allen Flanigan
(74) *Attorney, Agent, or Firm* — Schrantz Law Firm, PLLC; Stephen D. Schrantz

(57) ABSTRACT

An integrated reaction condensing heat exchanger system ("IRCHX") may be installed in a fossil power plant flue gas treatment system. More particularly, the IRCHX system may be used for recovering water from combustion flue gas by phase change to reduce fresh water consumption in fossil power plants including coal-, oil- and gas-fired plants. To recover water from flue gas, the IRCHX system may be installed in a current flue gas treatment system in a new or existing power plant, which allows power plants to save fresh water consumption up to 20%. Additionally, it benefits: 1) low temperature heat recovery after economizer, 2) lower exhaust temperature of flue gas at stack, 3) lower moisture contents in exhaust flue gas at stack, and 4) reduced acid emission in flue gas at stack.

6 Claims, 8 Drawing Sheets

(56) References Cited

U.S. PATENT DOCUMENTS

| | | | | |
|---|---|---|---|---|
| 4,729,328 | A | * | 3/1988 | Shellenberger ........ B01D 45/00 110/186 |
| RE33,082 | E | * | 10/1989 | Gerstmann et al. .. F24D 11/004 122/20 B |
| 5,050,541 | A | * | 9/1991 | Kobayashi et al. .. F22B 1/1869 122/235.11 |
| 5,857,324 | A | * | 1/1999 | Scappatura et al. . B01D 53/922 60/274 |
| 6,196,303 | B1 | * | 3/2001 | Hepper ................. F24F 1/0007 165/111 |
| 6,820,685 | B1 | * | 11/2004 | Carter et al. .............. F28B 1/06 165/150 |

\* cited by examiner

CONDENSING HEAT EXCHANGER SYSTEM

CROSS-REFERENCE TO RELATED APPLICATIONS

This application claims priority to and is a continuation in part of U.S. Application Ser. No. 61/724,898 filed on Nov. 9, 2012 entitled Integrated Reaction Condensing Heat Exchanger System.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

Field of the Invention

The present invention relates to a condensing heat exchanger system ("IRCHX"). In one embodiment the condensing heat exchanger system may be installed in fossil power plant applications. More particularly, the present invention relates to an IRCHX that decreases water consumption, increases energy efficiency, and lowers capital costs associated with fossil power plants.

Background of the Invention

Water supply issues are increasing in importance for new and existing power plants because the freshwater supply is limited. For companies considering the development of new thermoelectric power plants, water is a first-order concern. The impacts of water supply depend on the economics of water availability in the region in which the power plant is to be built. As demand for electricity and water increases, many thermoelectric power plants will find it difficult to obtain the large quantities of water needed to maintain operations. Most of the water used in a thermoelectric power plant is used for cooling. There is a need for reducing the amount of fresh water used by power plants because thermoelectric power plants utilize significant quantities of water. For example, a 500 MW power plant that employs a once-through cooling technique uses $4.5 \times 10^4$ m$^3$/h (approximately $45 \times 10^6$ kg/h) of water for cooling and for other process requirements.

Power plant exhaust gases release large amounts of water vapor into the atmosphere. The flue gas is a potential source for obtaining much needed cooling water for a power plant. There is almost 40% moisture (by wet coal mass basis) in lignite coal, which translates to 16% moisture by volume (wet basis) in the flue gas. For example, a 600 MW power plant firing lignite exhausts a flue gas flow rate of $2.7 \times 10^6$ kg/h, which includes a moisture flow rate of $0.43 \times 10^6$ kg/h, or about 16 wt % of the flue gas. In contrast, typical cooling tower evaporation rates for a 600 MW power plant unit are $0.7 \times 10^6$ kg/h.

If a power plant could recover and reuse a portion of this moisture, it could reduce its total cooling water intake requirement. The most practical way to recover water from flue gas is to use a condensing heat exchanger. The power plant could also recover latent heat due to condensation, and sensible heat due to lowering the flue gas exit temperature. Harmful acid gases such as $H_2SO_4$, HCl, and $HNO_3$ can also be condensed by the heat exchanger to prevent these acid gases from entering the atmosphere.

SUMMARY OF THE INVENTION

In one embodiment of the present invention, the condensing heat exchanger system ("IRCHX") is used for recovering water from combustion flue gas in fossil power plants. The IRCHX generally comprises a high efficiency condensing heat exchanger ("CHX"), an acid removal system ("ARS"), a cooling water storage tank ("CWST"), a CWST cooler and a CWST pump. In another embodiment, the invention is an integrated reaction condensing heat exchanger system for integration into a fossil power plant, the integrated reaction condensing heat exchanger system comprising (including or having) at least one condensing heat exchanger (CHX) comprising a duct (or housing) comprising a base, an external duct surface having a plurality of inlets and outlets along each side of the duct, a cross-flow type heat exchanger with counter flow fluid side selection to route flue gas and liquid water from opposite sides, at least one horizontal tube bank, and at least one vertical tube bank, with each of the tube banks having a plurality of tubes and each tube having at least one finned tube section 10 extending from the openings on the external duct surface. Each tube may further include a plurality of u-shaped bends upon which one or more fins are exposed through the duct. Each CHX may further include a reaction bed connected near the base of the condensing heat exchanger.

In yet another embodiment, the IRCHX may further include:
A. a means for simultaneously separating water vapors and acid vapors from combustion flue gas exhausted from a boiler or a gas turbine system;
B. a means for removing acid from the water-acid condensate by neutralizing any dissolved acids in the (condensed) coolant water;
C. a means for regenerating a reaction bed by using high temperature desorption process;
D. a means for collecting the coolant water into a water storage tank; and
E. a means for recirculating the coolant water in a closed loop, with the closed loop being in fluid communication with the water storage tank, the pump, the condensing heat exchanger, and the tank cooler.

The IRCHX system has higher condensation efficiency than a typical condensing heat exchanger because the present IRCHX (1) applies an innovative, novel tube configuration for increasing the probability density of colliding water vapors into the tube surfaces, (2) lowers interfacial temperature with combination of air- and water-cooled effects, (3) improves mass transfer coefficients with higher heat transfer coefficients in the shell and tube sides of the duct, and (4) enhances sufficient cooling water supply with the cooling water storage tank. Moreover, the IRCHX aids in saving fresh water because the coolant water is operated in closed loop with the CWST, thereby effecting low temperature heat recovery. In an embodiment where the CHX includes a packed-bed reaction system, this packed-bed reaction system is assembled under the base surface of the CHX duct (or housing) and assists in liquid phase acid removal. The IRCHX system also provides for 1) additional low temperature heat recovery after the economizer, 2) lower exhaust temperature of flue gas at the stack, 3) lower moisture contents in exhaust flue gas at the stack, and 4) reduced acid emission in flue gas at the stack.

The IRCHX may be installed between flue gas treatment system and the stack. The IRCHX may be immediately applied for use in existing fossil power plants, such as coal-, oil-, or natural gas-fired power plants, to save fresh water consumption. The IRCHX may also be utilized for any other type of power plant in need of water recovery from combustion flue gas, as well as those power plants in need of acid reduction and low temperature heat recovery. The IRCHX may be used as backup equipment to separate acids in case of other acid scrubber system failures. This IRCHX will also have significant technical impacts in power plant cooling technologies not only concerning saving fresh water consumption, but also concerning reducing flue gas exit temperature and reducing acid emission at stack. The technologies related to this modular system may be applied in other related industries including, without limitation, water recovery in other boiler systems, in emission control at refinery plants, and in design of inland power plants.

An advantage of the IRCHX includes a CWST closed loop which enables higher condensation efficiency, targeting 70% rather than current industry standards of 30% (under current power plant operating conditions), by feeding lower temperature water and higher flow rate of water to the IRCHX. The condensation efficiency (or water vapor capture efficiency) is essentially the percentage of moisture condensed from flue gas. More particularly, condensation efficiency is the total flow rate of water vapor condensed within the heat exchanger divided by the flow rate of water vapor entering the heat exchanger. Only fresh water that is combined with the IRCHX system is recovered, with the combination fed to the condenser. The heat exchanger component of the IRCHX system provides for higher condensing efficiency and for higher heat transfer coefficient because of the higher turbulence intensity of the IRCHX design. This system may also have applications in HVAC systems industrial and residential industries.

A primary objective of the present invention is to utilize an integrated reaction and condensing heat exchanger for condensing and recovering water vapor from a flue gas treatment system in power plants, wherein the invention may be integrated between the flue gas treatment system and the stack.

It is an objective of the present invention to deliver high condensation efficiency by increasing the effective heat transfer area for the colliding water vapors into the bare tube surfaces by reducing residence time of condensate film covering tube surface with an innovative novel tube configuration having a plurality of horizontal and vertical tube banks It is another objective of the present invention to deliver high condensation efficiency by lowering interfacial temperature from exposed portion of finned tubes on outer duct surface due to external natural convection.

It is yet another objective of the present invention to deliver high condensation efficiency by improving heat and mass transfer coefficients in the shell and tube sides of the condensing heat exchanger due to the plurality of vertical and horizontal tubes in the tube arrangement (or configuration), and the plurality of u-bend sections of each tube.

It is another objective of the present invention to deliver high condensation efficiency by offering high thermal capacity in coolant side using enough cooling water supply from the CWST.

Other objectives will be apparent from the disclosure.

DETAILED DESCRIPTION OF THE INVENTION

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Water Recovery in Power Plants

Water recovery in power plants is used to separate and regenerate water vapors involved in boiler flue gas into liquid water to save fresh water consumption. Flue gas 106 exhausted from boiler or gas turbine can be a potential source for obtaining the water needed for a power plant since flue gas 106 contains a large amount of water vapor in 6-16 vol %. Moisture can be phase-changed into liquid water and separated from flue gas by using condensation technology. U.S. Department of Energy has supported technology development for a condensing heat exchanger and a transport membrane condenser to apply the flue gas condensation for fossil fuel power plant applications.

Figure 1:
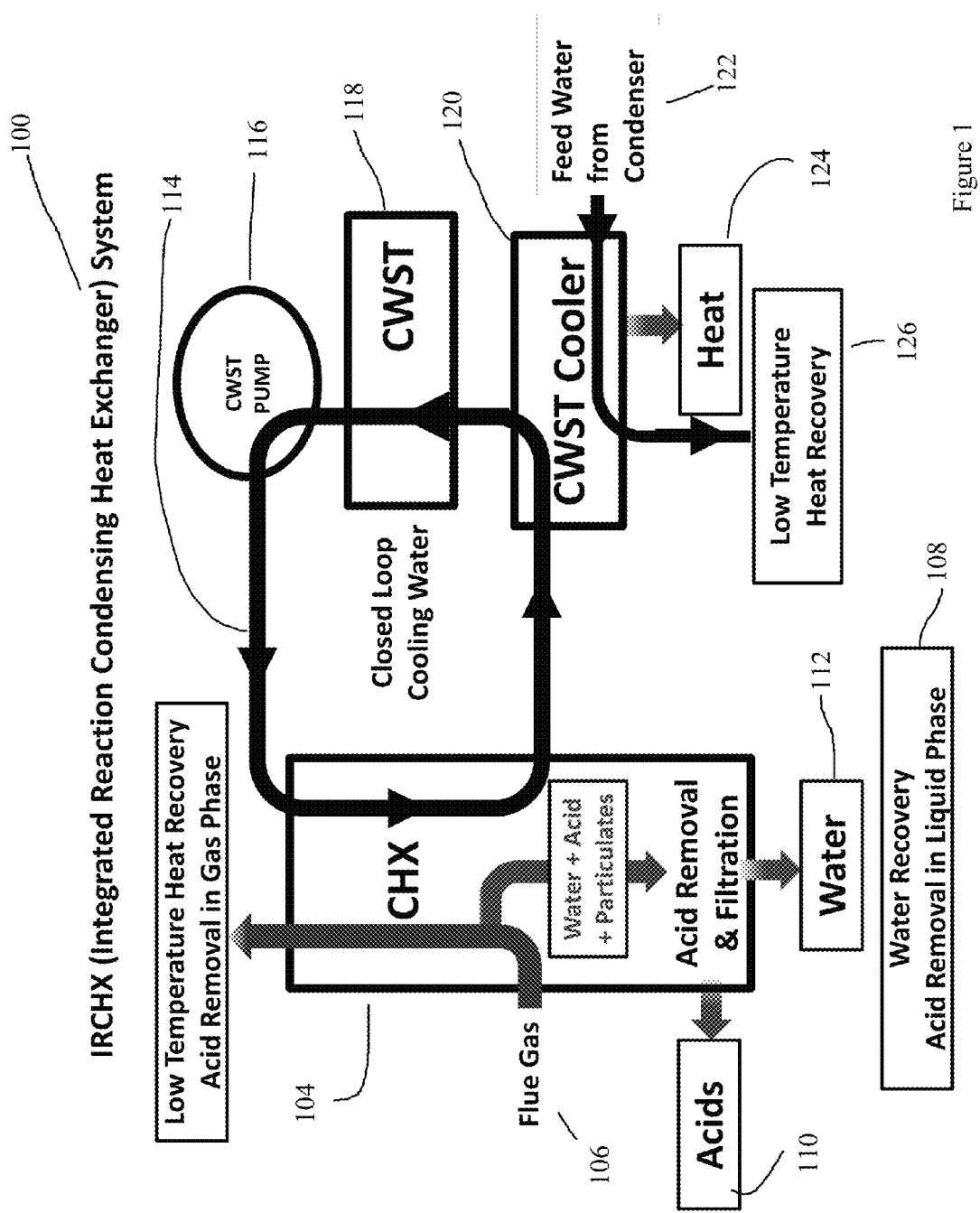
FIG. 1 is a schematic of one embodiment of an integrated reaction condensing heat exchanger system.

In one embodiment, the present invention is an integrated condensing heat exchanger system 100 comprising a condensing heat exchanger (CHX) 104, an acid removal system (ARS) 108, a cooling water storage tank (CWST) 118, a cooler 120, and a pump 116 as shown in FIG. 1. The IRCHX system 100 may be installed at post flue gas treatment system in the power plant. Flue gas 106 ranging 120-200° C. and cooling water ranging 15-37° C. are routed into the shell and tube side of the CHX 104 through the duct inlets, respectively. The boiler exit temperature is set to an industry standard, and averages 200° C. The flue gas 106 may be exhausted from a boiler or from a combustor.

Figure 2:
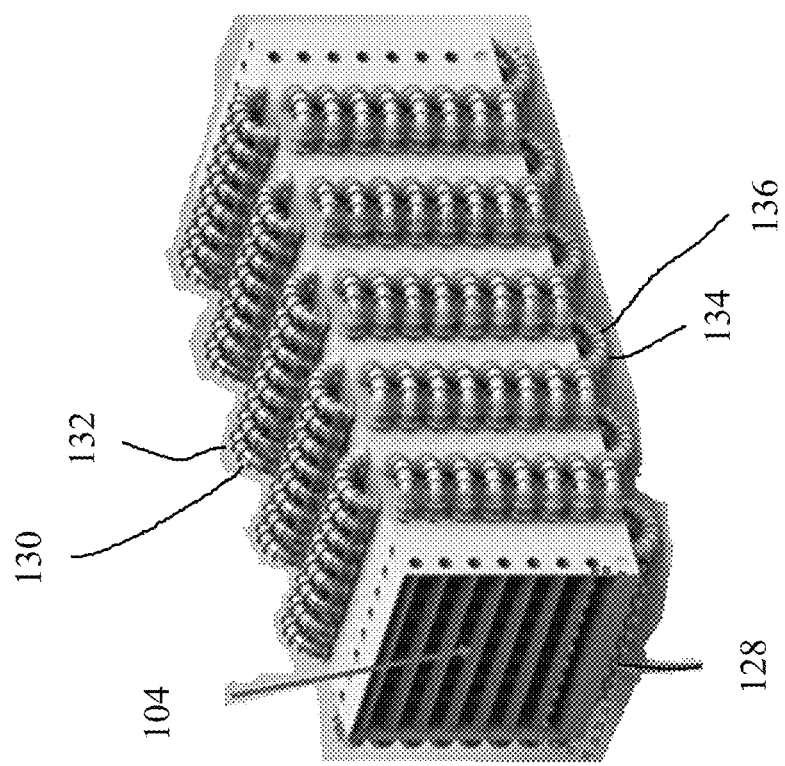
FIG. 2 is a perspective view of a condensing heat exchanger and an incorporated reaction bed of one embodiment of the present invention.

As depicted in FIG. 1, as the CHX 104 cools down flue gas 106, water 112 and minor acid vapors 110 are simultaneously separated from the flue gas 106 in the CHX 104. Condensation efficiency is kept at a set point by controlling the coolant feed rate or coolant temperature from the CWST 118. Film condensation of water vapors occurs on each of the tube surfaces as the tubes surface temperature cools down below the dew point of water vapor in flue gas 106. The condensed water 112 is then separated by density difference and is collected at the bottom of heat exchanger 104. After filtration, acid removal, and/or demineralization, the water is then recycled into appropriate water supplies including without limitation feed water, make-up water for cooling tower, or for use in any other application. ARS alkalizes the acidic water condensates by using a packed-bed reaction system assembled under the CHX (FIG. 2). ARS removes 90% of aqueous acids dissolved in water condensates by using reaction technology, such as neutralization reaction, catalytic reaction, adsorption reaction, or any other comparable reaction technology. After demineralization, recovered water will be utilized for make-up water or other use in power plants. The CWST cooler 120 reduces the raised temperature of coolant water by using feed water from the condenser 122 and routes the cooled water into the CWST 118. The coolant water is recirculated in a closed loop 114 using a CWST 118 and CWST pump 116.

Figure 3:
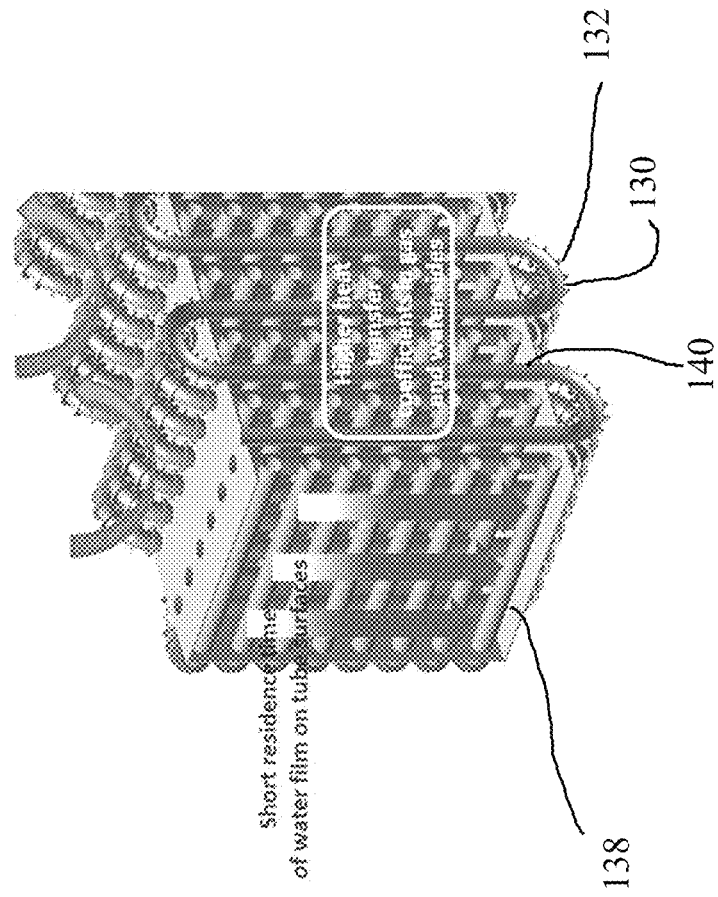
FIG. 3 is a cutaway view of a condensing heat exchanger of one embodiment of the present invention.

To lower the coolant temperature, the CHX 104 is used in connection with an air-cooled condenser by exposing a plurality of u-shaped tube sections 130, 134 with fins 132, 136 out of plane to the duct surface, to immediately take cooling effects with natural convection as shown in FIGS. 2 and 3. As the water passes the finned 132, 136 u-bend tube sections 130, 134, the cooling water temperature drops down to 1~2° C., which reduces interfacial temperature on the tube surface 130, 132, 134, 136 in the CHX 104, followed by lower interfacial mole fraction of water vapor on the bare tube 138, 140 without fins within the CHX 104.

Condensate liquid film made by water condensation tends to behave as a resistance to convective heat and mass transfer because the film temperature is slightly higher than the actual tube surface temperature. The liquid film on the tube surface 130, 132, 134, 136, 138, 140 should be removed as quickly as possible to secure more effective heat transfer areas in the CHX 104 so that the probability density of the colliding water vapors directly into the effective tube surface is maximized. Roughness and friction factors of materials are taken into account in tube selections since surface tension between liquid film and tube surface should be reduced to increase tube surface area uncovered with liquid film.

Within the duct, disadvantages of typical heat exchangers, having either a vertical or a horizontal tube configuration, may be overcome by applying the combined horizontal 138 and vertical tube 140 arrangements of the present CHX 104. The configuration of the present tube configuration enhances the effective tube surface areas and heat/mass transfer coefficients. The tube side of the present tube configuration increases convective heat transfer coefficients by applying a plurality of u-bend tube sections 130, 134, due to continued thermal/momentum entry region right following every bend of each tube 130, 134.

Figure 4:
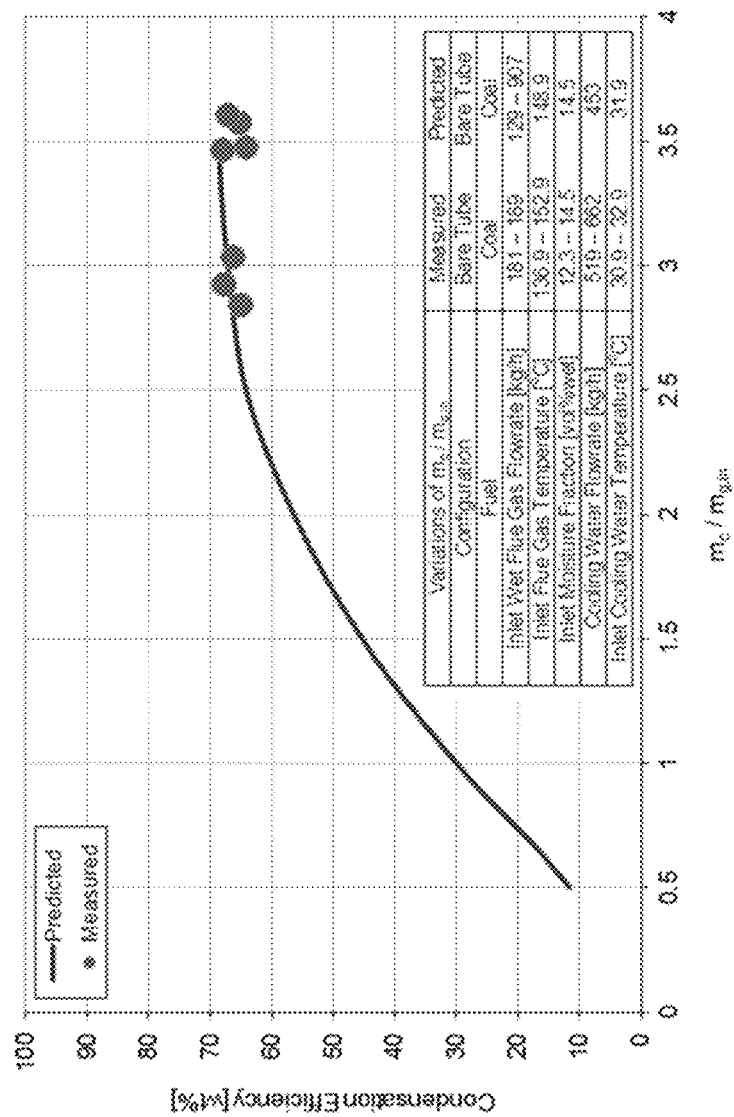
FIG. 4 is a graph of the condensation efficiency with variations of mass ratio in CHX.

FIG. 4 shows experimental and computational study results on condensation efficiency of typical condensing heat exchanger. Through a case study in a coal-fired power plant, performance of the novel tube configuration of the invention can be estimated by demonstrating minimum performance of typical condensing heat exchangers having only a vertical tube configuration. Condensation efficiency is defined as the weight % ratio of total condensation rate to inlet water vapor flow rate. This is used to evaluate the performance of the condensing heat exchangers. The mass ratio at x-axis shows the ratio of cooling water mass flow rate to flue gas mass flow rate in condensing heat exchanger.

Computed condensation efficiency varies 10 to 70% as the mass ratio increases from 0.5 to 3.5, which is compared with measured data in high mass ratio range. The CHX will ensure higher condensation efficiency than a typical heat exchanger since the present CHX applies higher heat/mass transfer coefficients resulting from the combined vertical/horizontal configuration and from the lower interfacial temperature made in cooling water tube side based on exposed finned tube sections. It is possible to control condensation efficiency of IRCHX by applying a modeling curve into operation input of CWST pump.

Figure 5:
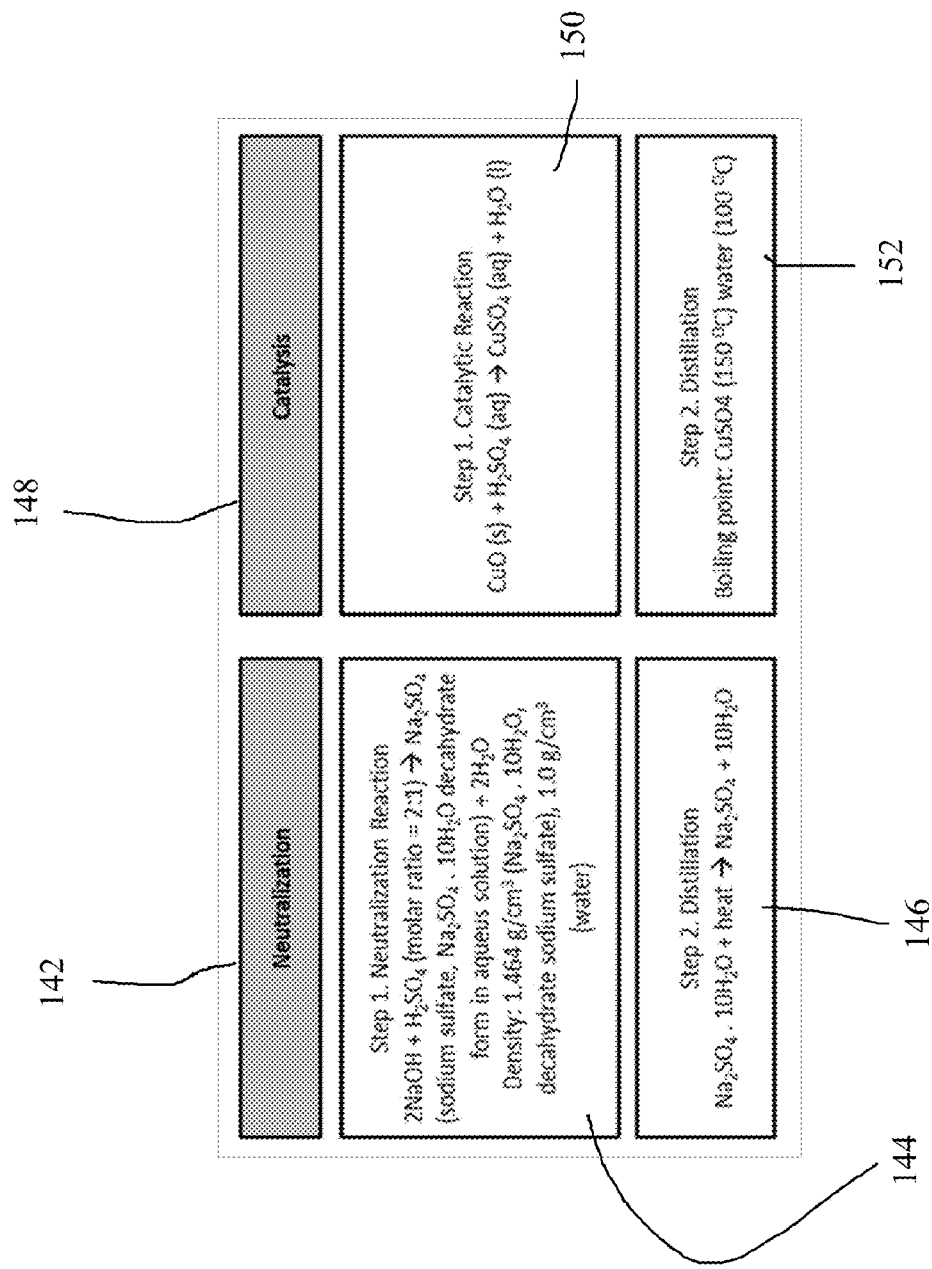
FIG. 5 is a flowchart showing a reaction scheme of one embodiment of the present invention.

In another embodiment (FIGS. 5 and 6), the IRCHX 100 further includes an ARS. As shown in FIG. 5, the ARS separates various acids, such as $H_2SO_4$, $HNO_3$, HCl, and any other acids from power plants, from acids-diluted water condensates by applying admixture of neutralizers at Neutralization 142 with Neutralization Reaction 144 and Distillation 146, catalysts at Catalysis 148 with Catalytic Reaction 150 and Distillation 152, and an activated carbon bed.

Figure 6:
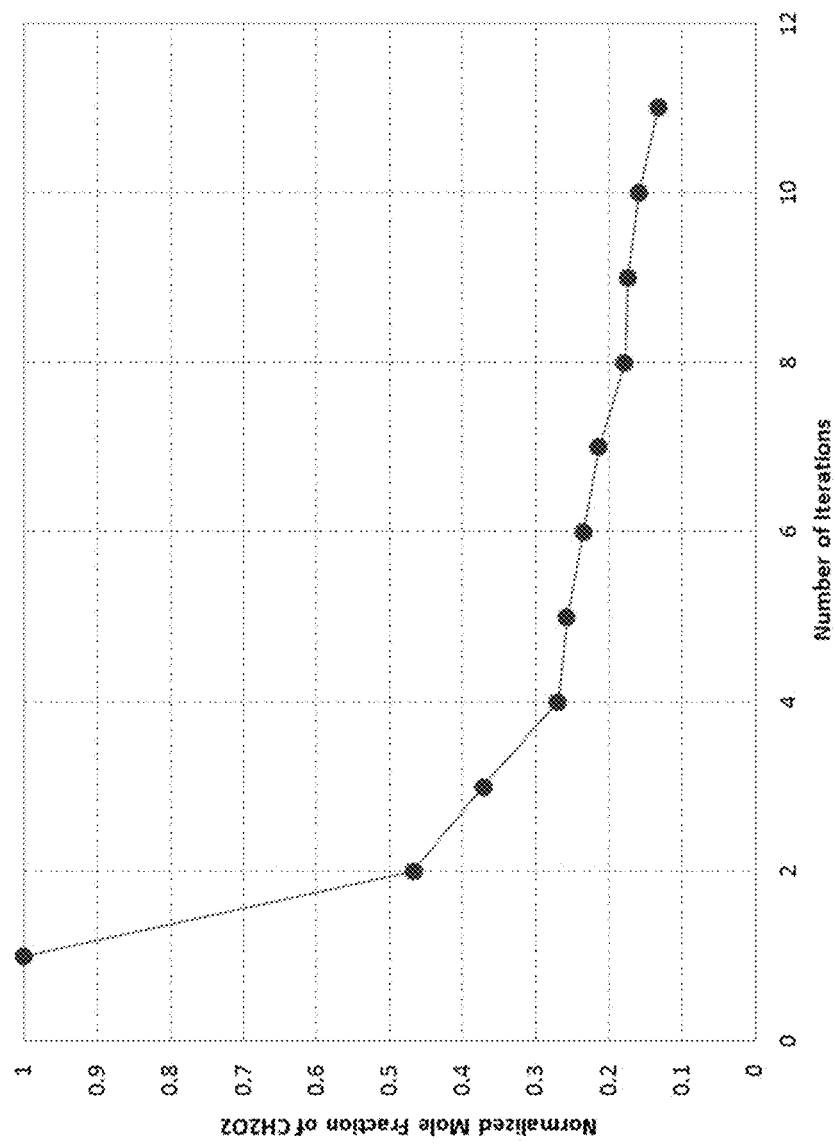
FIG. 6 is a graph of the acid removal efficiency of one embodiment of the present invention.

As shown in FIG. 6, preliminary test results have been obtained on 1,000 ppm formic acids ($CH_2O_2$) diluted water by using only activated carbon fibers. There was approximately 90% separation efficiency even though formic acid has 1.9 times stronger acidity than sulfuric acids.

Applying combined methods will secure higher removal efficiency based on adsorption and neutralization. Admixture of the reaction bed can be regenerated using a thermal reactivation method which utilizes high temperature steam desorption process.

Figure 8:
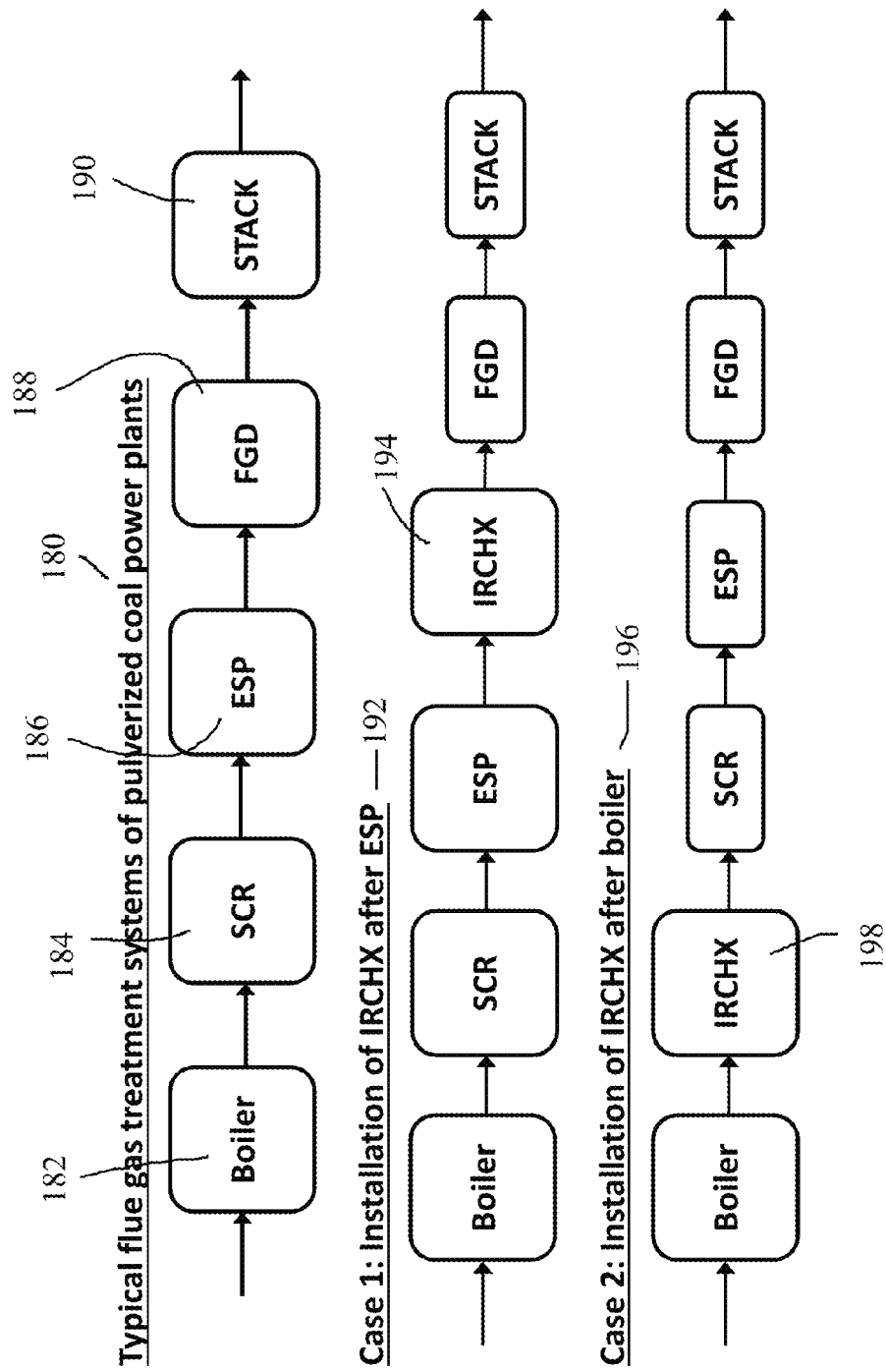
FIG. 8 shows two different implementations of an IRCHX of one embodiment of the present invention.

The IRCHX system 100 can be installed into a current flue gas treatment system. As shown in FIG. 8, there is no low temperature heat recovery step in pulverized coal power plant flue gas treatment systems 180. The present invention addresses this deficiency and in one embodiment, is specifically designed for fossil power plants including coal-, oil- or natural gas-fired options. Case 1 (192) of FIG. 8 represents installation of the IRCHX system 194 right after ESP 186 (Electrostatic Precipitator) to condense water vapors from more transparent medium with diluted acids condensates. Capital and maintenance costs will vary depending on location of IRCHX 194. With Case 1, the IRCHX system 194 has a longer life because there is less particulate accumulation in the reactor element, such as acid filtration and removal, which are removed upstream of the IRCHX system.

Case 2 (FIG. 8) represents installation of the IRCHX system right after boiler 182 economizer. Here, the IRCHX system 198 may need more coolant water flow rate, but may gain higher heat recovery rates and better acid removal/filtration effects. Reduced mass and acidity will result in reduced catalysis requirement and facility size in following flue gas treatment systems including selective catalytic reduction (SCR) 184, ESP 186, and flue gas desulfurization (FGD) 188. There is greater heat recovery in Case 2 when compared to Case 1. Some heat is lost in SCR 184 and ESP 186 when the IRCHX system is downstream. Heat recovery impacts total plant operating costs, rather than just the flue gas treatment system. Here, there is lower capital and operating cost of the equipment.

Figure 7:
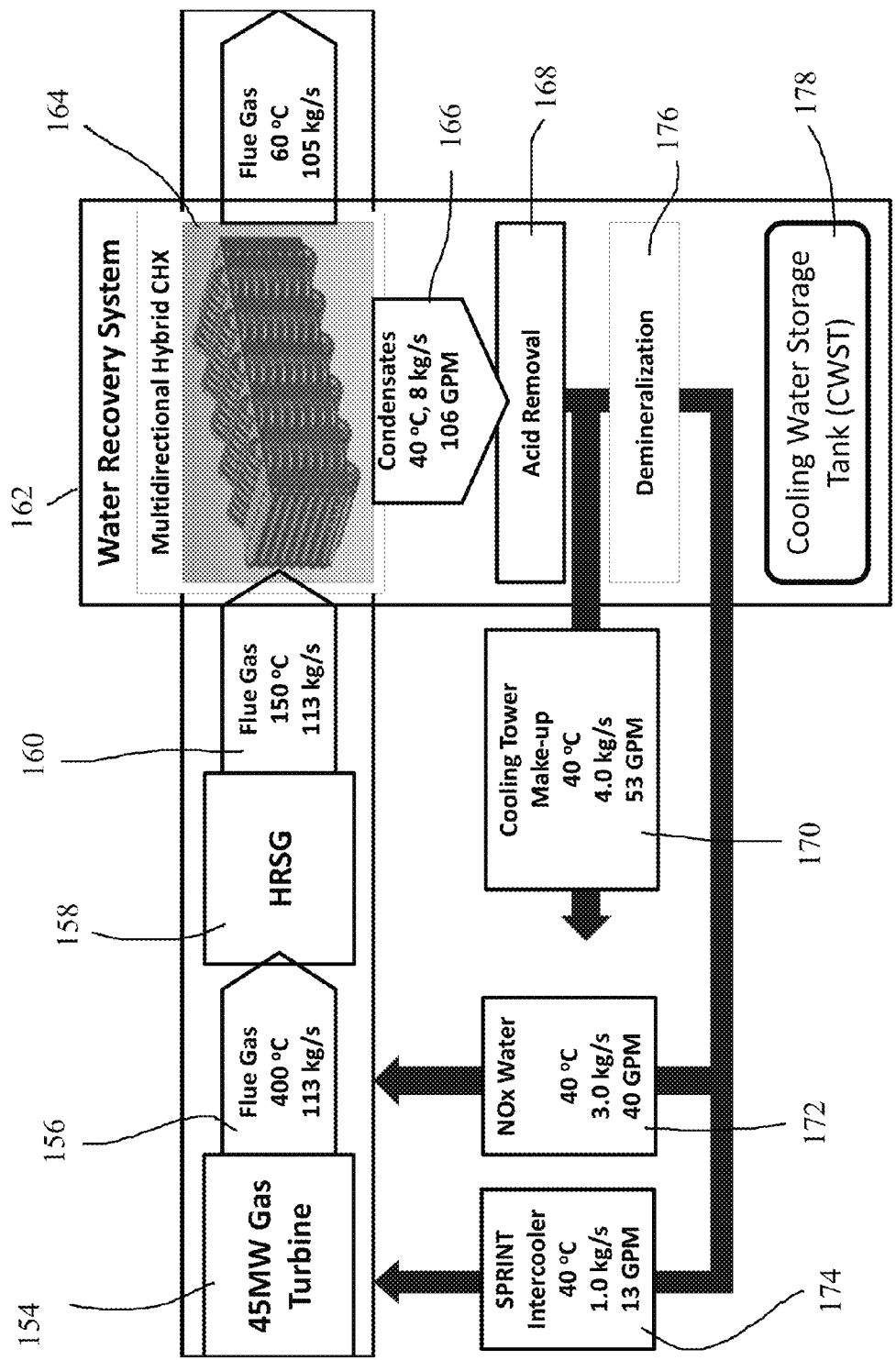
FIG. 7 shows one embodiment of the present invention of an IRCHX application for a 45 MW gas turbine power plant.

In another embodiment (FIG. 7), the IRCHX 162 is installed in a full scale combined gas and steam turbine power plant cycle for water and heat recovery. In the case of combined cycle power plant with a 45 MW natural gas turbine 154 (Case 3), the proposed system is installed after the exit of HRSG 158, with flue gas (113 kg/s) 158 routed into the CHX 164. Assuming 14 vol % moisture content and 50% condensation efficiency, 8 kg/s of water condensates 166 are separated from the flue gas due to film condensation on the tube surface and the dissolved acids in the water condensates are neutralized in the acid removal system 168. After demineralization 176, about 50% of the recovered water from the acid removal system is recycled into the cooling tower make-up 170 and another half portion of the recovered water goes to the gas turbine intercooler system 174 and De-NOx water system 172. Cooling water is supplied from the cooling water storage tank (CWST) 178 with a closed loop. The water stored in tank is cooled down by boiler/HRSG feed water coming from the condenser. The gas turbine cycle requires 1.0 kg/s for intercooler 174 and 3 kg/s for De-NOx system 172, which can be fully covered by half of the recovered water. Remaining water can be recirculated for cooling tower make-up 170 at 4 kg/s. The exhaust temperature at the exit of HRSG (heat recovery steam generator) cools down from 150° C. to 60° C.

With application of this water recovery system, the combined cycle power plant saves fresh water consumption for use in the intercooler, De-NOx water system, and cooling tower make-up. The system also aids in acid reduction in flue gas and provides additional heat gain to the HRSG/boiler feed water.

Water recovery has potential impacts on power in terms of water consumption, fuel, thermal efficiency, and environmental sustainability. It is anticipated that water recovery at the CHX and low temperature heat recovery at the CWST will have positive impacts on operational cost and thermal efficiency for the overall power plant. A reason for this positive impact is that fresh water consumption is significantly reduced, and boiler/HRSG feed water will gain additional heat from the CWST cooler. The reduction of exhaust temperature and harmful acid emission in stack 190 will make a significant impact on environmental sustainability. Water recovery could benefit power plants (1) by saving fresh water, (2) by employing sensible and latent heat recovery, (3) by maximizing acid reduction in stack gas, (4) by utilizing overall thermal efficiency, and (5) by lowering operational costs.

Fresh water consumption is reduced during operation of this system and method by theoretically having zero net water consumption at steady state. Generally, a pre-scrub condensation step reduces the total flue gas volume substantially, thereby substantially reducing cost by reducing scrubber capacity requirement. A post-condensation liquid-solid acid removal and filtration is typically only employed in water treatment. The present invention involves a novel design of the CHX as well as integration of the CHX with post condensation liquid-solid acid removal and filtration.

Considerations for Water Recovery System for Power Plant Applications

In applying the novel condensing heat exchanger ("CHX") system to power plants, the condensation efficiency should be considered and defined as the weight % ratio of total condensation rate to inlet water vapor flow rate. The condensation efficiency is used to evaluate the performance of the condensing heat exchangers. Condensation efficiency ($\eta_{cd}$) is expressed as follows in Equation (1):

$$\eta_{cd}[\text{wt \%}] = \frac{\dot{m}_{cd,tot}}{\dot{m}_{H_2O,in}} \times 100 \quad \text{Equation (1)}$$

where $\dot{m}_{cd,tot}$ is mass flow rate of water condensates and $\dot{m}_{H_2O,in}$ is mass flow rate of water vapor at inlet of the CHX. The mass flow rate of water vapor at the CHX system inlet is obtained from conversion of mole fraction of water vapors at the inlet into mass fraction. The mass flow rate of cooling water is an important factor affecting condensation efficiency since it is related to the heat absorption capacity of the cooling water. However, the mass flow rate of cooling water ($\dot{m}_c$) is more meaningful when known relative to the mass flow rate of wet flue gas at the inlet ($\dot{m}_{g,in}$). Moreover, better condensation efficiencies were expected with higher ratios of cooling water to flue gas flow rates.

A case study was performed to predict condensation efficiency for $0.5 < \dot{m}_c/\dot{m}_{g,in} < 3.5$ with coal combustion flue gas at 148.9° C. and cooling water at 31.9° C. at each inlet after the accuracy of the analytical model was verified as shown in FIG. 4. FIG. 4 depicts the effect of $\dot{m}_c/\dot{m}_{g,in}$ on condensation efficiency for $0.5 < \dot{m}_c/\dot{m}_{g,in} < 3.5$. The prediction was validated in the range from 3.0 to 3.5 of $\dot{m}_c/\dot{m}_{g,in}$ with experimental data, and then extended to 0.5. Condensation efficiency varies from 10% to 70% as $\dot{m}_c/\dot{m}_{g,in}$ increases from 0.5 to 3.5 under the specific boundary conditions stated in the caption.

Measured data in FIG. 4 includes inlet wet flue gas flow rate at 181-189 kg/h, inlet flue gas temperature at 136.9-152.9° C., inlet moisture fraction of 12.3-14.5 vol %, cooling water flow rate at 519-662 kg/h, and inlet cooling water temperature at 30.9-32.8° C. The measured data were compared with predicted data under the boundary conditions having inlet wet flue gas flow rate at 129-907 kg/h, inlet flue gas temperature at 148.9° C., inlet moisture fraction at 14.5 vol %, cooling water flow rate at 453 kg/h, and inlet cooling water temperature at 31.9° C.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A condensing heat exchanger device for reducing the water content of a flue gas flowing across the device from a boiler, the device comprising:
    a housing adapted to be secured to the boiler for passage of the gas through the housing;
    a housing entrance of the housing wherein the flue gas flows into the housing entrance;
    a housing exit of the housing wherein the flue gas flows from the housing entrance towards the housing exit for passing through the housing;
    a horizontal conduit that extends horizontally in a direction non-planar to the flow of the gas;

a curved section of the horizontal conduit that directs the horizontal conduit in a direction planar to the flow of the gas;

a vertical conduit that extends vertically;

a curved section of the vertical conduit that directs the vertical conduit in a direction planar to the flow of the gas;

at least one fin extending outward from the curved section of the horizontal conduit;

at least one fin extending outward from the curved section of the vertical conduit;

a cooling fluid flowing through the vertical conduit and the horizontal conduit from the housing exit towards the housing entrance against the flow of the flue gas;

wherein the horizontal conduit within the housing is constructed from conduit without fins;

the vertical conduit within the housing is constructed from conduit without fins; and a base for collection of the water.

2. The device of claim 1 wherein the curved section of the vertical conduit is located exterior of the housing wherein the housing limits the amount of flue gas flowing across the curved section of the vertical conduit.

3. The device of claim 1 wherein the curved section of the horizontal conduit is located exterior of the housing wherein the housing limits the amount of flue gas flowing across the curved section of the horizontal conduit.

4. The device of claim 1 wherein the cooling fluid flows in a closed loop.

5. The device of claim 1 further comprising:

a reaction bed wherein the water collected at the base flows to the reaction bed to remove at least a portion of the acids from the water;

a water storage connected to the reaction bed wherein the water flows from the reaction bed to the water storage.

6. A condensing heat exchanger system to be applied in a fossil power plant for reducing the water content of a flue gas from a boiler, the system comprising: a housing comprising a top wall, a bottom wall, a left side wall, and a right side wall wherein the flue gas flows through the housing; a housing entrance of the housing wherein the flue gas enters the housing at the entrance; a housing exit of the housing wherein the flue gas leaves the housing at the exit; a horizontal conduit that extends horizontally within the right side wall and the left side wall; a curved section of the horizontal conduit that directs the horizontal conduit from the exit to the entrance; a vertical conduit that extends vertically within the top wall and the bottom wall; a curved section of the vertical conduit that directs the vertical conduit from the exit to the entrance; a pump directing the cooling fluid through the vertical conduit and the horizontal conduit from the housing exit towards the housing entrance against the flow of the flue gas; at least one fin extending outward from the curved section of the horizontal conduit; at least one fin extending outward from the curved section of the vertical conduit; and a base for collection of the water;

wherein the horizontal conduit within the housing is constructed from conduit without fins; and the vertical conduit within the housing is constructed from conduit without fins.

\* \* \* \* \*